United States Patent [19]

Simonyi et al.

[11] Patent Number: 4,914,983
[45] Date of Patent: Apr. 10, 1990

[54] SYSTEM FOR FREEING A MOTOR VEHICLE BY REPEATED FORWARD-REVERSE OPERATION

[75] Inventors: Sándor Simonyi, Salgótarján; László Töröcsik, Budapest; György Válóczi, Salgótarján, all of Hungary

[73] Assignee: Csepel Autogyar, Szigetszentmiklos, Hungary

[21] Appl. No.: 248,813

[22] Filed: Sep. 23, 1988

[30] Foreign Application Priority Data

Oct. 14, 1987 [HU] Hungary .................... 2251-4626/87

[51] Int. Cl.$^4$ ............................................ B60K 41/22
[52] U.S. Cl. ........................................ 74/866; 74/877; 192/0.092
[58] Field of Search ................ 74/865, 866, 877; 192/0.092, 0.096, 0.098

[56] References Cited

U.S. PATENT DOCUMENTS

| | | | |
|---|---|---|---|
| 2,887,199 | 5/1959 | Funk | 192/0.098 |
| 3,543,891 | 12/1970 | Mathers | 192/0.094 X |
| 3,910,389 | 10/1975 | Pleier | 192/4 C |
| 4,300,652 | 11/1981 | Redzinski et al. | 192/4 C X |
| 4,419,909 | 12/1983 | Opperud et al. | 74/866 X |
| 4,475,637 | 10/1984 | Oguma et al. | 192/0.092 X |
| 4,724,726 | 2/1988 | Knecht | 74/866 |
| 4,768,636 | 9/1988 | Ito et al. | 192/0.092 X |
| 4,769,774 | 9/1988 | Narita et al. | 74/866 X |

FOREIGN PATENT DOCUMENTS

| | | | |
|---|---|---|---|
| 62-39333 | 2/1987 | Japan | 74/866 |
| 62-199539 | 9/1987 | Japan | 74/866 |

Primary Examiner—Leslie Braun
Assistant Examiner—Chris Campbell
Attorney, Agent, or Firm—Schweitzer & Cornman

[57] ABSTRACT

The invention relates to a process for starting a vehicle with repeated forward-reverse run, in course of which in the drive-chain of the vehicle an automatic transmission /2/ is driven with an internal combustion motor /1/ through the incorporated hydrodynamic torque converter /16/ or in a given case with a dry friction clutch /15/ shortcircuiting it, either directly with the automatic transmission /2/ and/or the cardan shaft /3/, thereafter, by the aid of at least one differential gear /4/ and the half-axes connected thereto at least one pair of wheels /6/ is put into a rotary motion, while gear-change of the automatic transmission /included the function of the dry friction clutch /15// are carried out with an auxiliary energy having been controlled with electromagnetic valves /7/, furtheron fuel supply to the motor /1/ is controlled by means of a throttle pedal; the process can be characterized in that from the angular velocity—being proportional with the velocity of the vehicle being 3 km/h at most, practically zero—of the part of the drive-chain beginning with the output shaft of the automatic transmission /2/ and ending with the wheels /6/, i.e. a structural part or a pair of structural parts an electric signal is formed by means of a signal transmitter /12/ measuring angular velocity, furtheron, from the number of revolutions of the crankshaft of the motor /1/ or any other component rotating therewith with a number of revolutions being proportional, or from the number of revolutions of the drive-in shaft of the gear-part of the transmission /2/ at the number of revolutions of the basic run another electric signal is formed by means of a signal transmitter /9/ measuring angular velocity; from the normal position of the throttle pedal /10/ a further electric signal is formed by the aid of a signal transmitter /11/ indicating the position of the throttle pedal /10/, at last, by means of a switch staying at disposal of the driver a command signal is given for the start with repeated forward-reverse run and in case of the simultaneous presence of said signals, by displacing the throttle pedal and allowing it to return into its basic position we give a command signal to the electromagnetic valves /7/ shifting alternatively to the bottom gear and the reverse gear, respectively.

3 Claims, 2 Drawing Sheets

SYSTEM FOR FREEING A MOTOR VEHICLE BY REPEATED FORWARD-REVERSE OPERATION

BACKGROUND AND SUMMARY OF THE INVENTION

The invention relates to a system enables the freeing of motor vehicles provided with an automatic transmission, by repeated forward-reverse operation.

As is well known, in the course of driving under conditions of limited traction, it often occurs that when starting, driven wheels spin due to high rolling resistance of the vehicle. In this case the driver tries to "rock" the vehicle from its stationary position by moving forward and backward. This can be carried out in the quickest and most advantageous way if the driver shifts the transmission alternately into forward and reverse gears.

Although an automatic transmission gear change can be carried out easily by moving the shift lever, problems may arise in respect to the fact that change of direction takes place in a state of motion of the vehicle and engine, which may result in coarse shiftings and eventually in damage to the driving system. In consideration of the fact that vehicles typically need to be started in this way rather infrequently, producers of vehicles generally are of the opinion that drivers should pay increased attention to the gear-change procedure and no special equipment is provided to assist this procedure. Considering that drivers in such situations typically may be inconsistent and inattentive, the viewpoint of the producers is regarded as rather erroneous.

Accordingly an objective of our invention is to provide a system whereby vehicles, provided with automatic transmission, can be freed by repeated forward-reverse shifting without coarse shifting. This is achieved by so controlling the transmission that, when the driver initiates a gear-change, he only begins a signal to change the direction. The actual gear change takes place in a controlled manner, when the state of motion of the vehicle and the motor are at suitable levels.

More specifically, the invention is directed to a method and apparatus for freeing a locked-in vehicle by forward and backward rocking, wherein the entire operation can be controlled semiautomatically, simply by pressing and releasing the throttle pedal. The system is provided with a master control switch, which normally disables the rocking control. When the switch is actuated, then the system is set into motion by a sensing of wheel speed equal to near zero, engine speed not significantly in excess of idle, and a depression of the throttle pedal. The automatic transmission immediately shifts into forward gear and drives the wheels in a forward direction, until the throttle pedal is released. Upon release of the throttle pedal, and return of the wheel and engine speeds to desired low levels, the system is reenabled, and can be reactivated by simply pressing again on the throttle pedal. By means of a flip-flop control in the system, the next pressing of the throttle pedal causes the automatic transmission to be shifted into reverse, so that the vehicle is rocked in the opposite direction. Alternate pressings and releasings of the throttle thus cause the vehicle to be shifted alternately into forward and reverse. The intervening requirements are that the engine and wheel speeds be allowed to return to a level at which the shifting can occur without damage to the transmission and/or drive train.

The invention will be described in detail by reference to a preferred embodiment, by the aid of the accompanying drawings.

DESCRIPTION OF A PREFERRED EMBODIMENT

Figure 1:
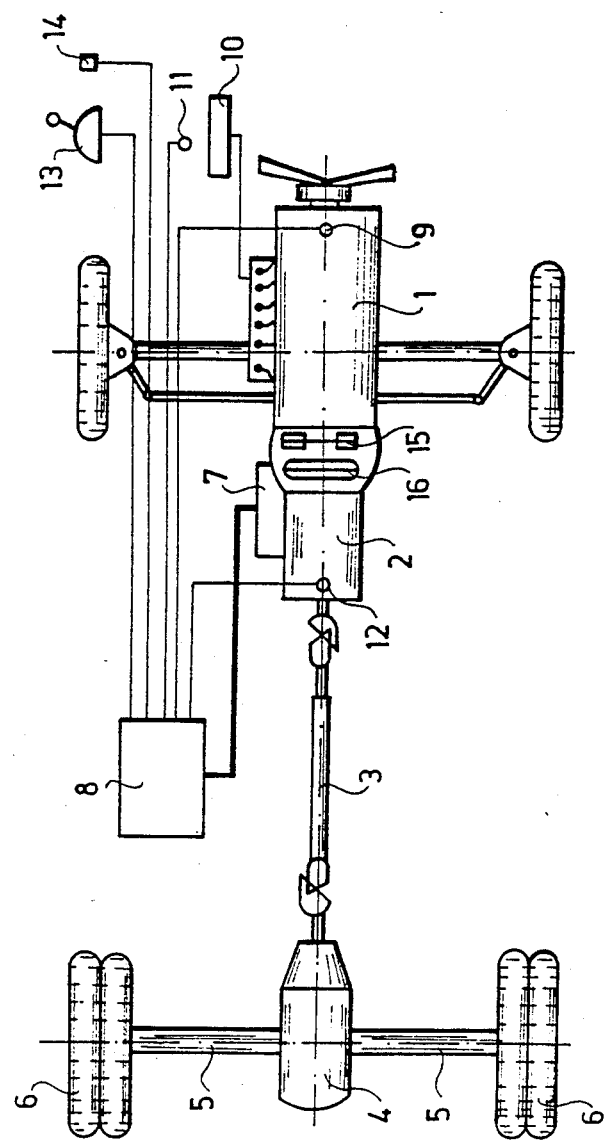
FIG. 1 is a schematic view of the drive train of a vehicle incorporating a control system according to the invention.

Using the system according to the invention we completed the control of the automatic transmission of an autobus designed for travelling in urban traffic. The motor 1—in the present case a six-cylinder Diesel-motor—represents the power source of the bus, driving an automatic transmission 2. The automatic transmission 2 has three forward gears and one reverse gear, and its gear-part is connected to the crankshaft of the motor 1 via a hydrodynamic torque converter 16 or a dry friction clutch 15 bypassing it. Shifting to the direct drive of the transmission 2, i.e., closing of the dry friction clutch 15, is controlled by electromagnetic valves 7 of an electromagnetic valve system. Electromagnets of the electromagnetic valves 7 are connected to the output of a control unit 8.

The output shaft of the automatic transmission 2 is connected to a differential gear 4 via a drive shaft 3, while the differential gear 4 is connected with wheels 6 via half-axles 5. For the sake of order it should be mentioned that the arrangement according to the invention can be suitably used for passenger cars, too. However, as is well known, with passenger cars with frontal drive and rear-engines, the differential gear and transmission are united in one unit, and, no connecting drive shaft is utilized.

Different control systems use different basic information signals for the control of the automatic transmission 2. These basic signals are delivered by appropriate signal transmitters. Independently of the signal sources applied with a given system, the new system according to the invention requires the aforementioned signal transmitters. It goes without saying that these may correspond entirely or partly to the signal transmitters serving for the normal control of gear-change.

Angular velocity of the wheel 6 gives one of the required information signals. In consideration that there is a direct connection between the wheel and the automatic transmission 2, the velocity of the wheel 2 can be properly characterized by the number of revolutions of the output shaft of the automatic transmission 2. Accordingly, a transmitter 12, indicating angular velocity, is associated with output of the automatic transmission 2, which is simultaneously giving the signal needed for the speedometer of the vehicle. If the vehicle is provided with an anti-lock brake system, every wheel is provided with a separate signal transmitter for the angular velocity and the signals thereof can be advantageously used for the control according to the invention. In this case there is no need to install a separate signal transmitter for the angular velocity to the output shaft of the transmission.

The number of revolutions of the motor 1 gives the next information signal needed. Since the crankshaft of the motor 1 and the shaft of the engine cam shaft are connected by a constant transmission gear ratio of 2:1, the number of revolutions of the cam shaft can be used as a signal of engine angular velocity. Accordingly a transmitter 9 of the signal of engine angular velocity is arranged there. Automatic transmission control systems also exist, in which a signal transmitter for angular velocity is arranged at the outdrive shaft of the hydrodynamic torque converter (i.e., at the indrive shaft of the gear part), and the number of revolutions of the motor also can be measured thereby.

Both the signal transmitter 9, for the angular velocity of the engine, and the signal transmitter 12, indicating angular velocity of the transmission output, generate electric signals. The gear ratios between measured angular velocities and angular velocities actually to be evaluated are considered in the control unit 8 shown in FIG. 2.

A further information signal required is given by the position of the throttle pedal 10, controlling the fuel supply system of the motor 1, namely whether it is in its basic (idle) position or it is pressed down. As the extent of the gas supply is unimportant, for the control according to the invention, one signal transmitter 11—indicating simply whether the throttle pedal is pressed or released—is used, also generating an electric signal.

Finally, a control switch 14 is provided, by means of which the driver gives the command for the implementation of the system according to the invention. This can be arranged either in the gear selector-switch 13, used for selecting the versions of gear-change, or it can be installed as an independent switch.

The aforementioned signal sources are connected to the corresponding inputs of the control unit 8. The signal transmitter 12 for the angular velocity of the wheels is connected to the input 17; the signal transmitter 9 for the angular velocity of the engine is connected to the input 18; the signal transmitter 11, indicating the position of the throttle pedal, is connected to the input 19; and the control switch 14 is connected to the input 20.

As already mentioned before, the control unit 8 controls fully the automatic transmission 2, so other signal sources may be connected to its inputs, too. The system according to the invention is described as used with a normal control. Accordingly, the control unit 8 will be detailed only to an extent which is needed for the comprehension of the system.

As a matter of fact, vehicles may be retrofitted with the apparatus. These can be formed as independent units.

Figure 2:
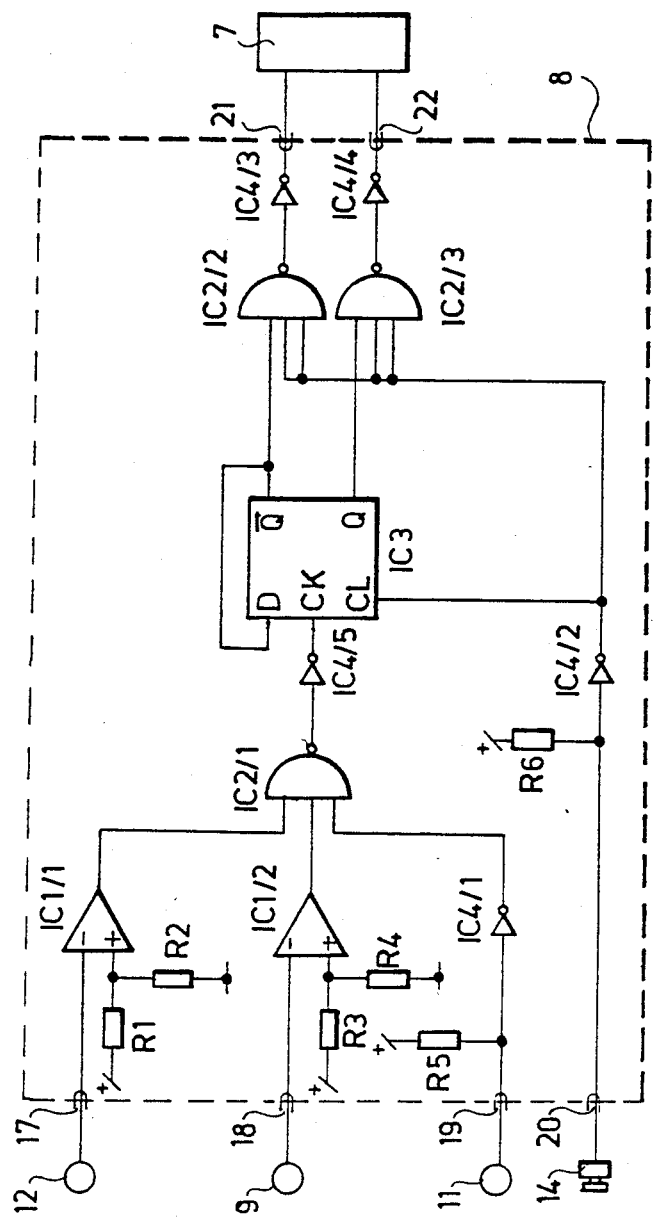
FIG. 2 is a circuit arrangement of a control unit appropriate for realizing the invention.

The part of the control unit 8 incorporating our invention is shown in FIG. 2. The following electronic elements were used for its completion (Identification corresponds to the IC-catalogue of the Technical Publishers.): A quadruple operational amplifier (LM 324), of which comparator units, IC 1/1 and IC 1/2 are used; a 3×3 NAND gate (74 LS 10) containing units IC 2/1–IC 2/3; a sixfold invertor (74 LS 04) containing a flip-flop IC 3 invertor units IC 4/1–IC 4/4 (type 74 LS 74 D); additionally R1–R6 resistors were also installed. However, the apparatus can be assembled from several other electronical elements being suitable for our purpose.

The part of the control unit 8 incorporating the invention is assembled from the aforementioned parts in the following way:

For receiving the signal of the angular velocity of the wheels, the input 17 is connected to one of the inputs of the comparator IC 1/1, while the other input is connected to the positive pole of the supply voltage via a voltage divider consisting of resistors R1–R2. The output of the comarator IC 1/1 is connected to one of the inputs of the NAND gate IC 2/1.

The input 18, receiving the signal for the angular velocity of the engine, is connected to one of the inputs of the comparator IC 1/2, while the other input of the comparator IC 1/2 is connected to the positive pole of the supply voltage through the voltage divider consisting of resistors R3–R4. The output is connected to the second input of the NAND gate IC 2/1.

The input 19, for the signal of the position of the throttle pedal, is connected to the third input of the NAND gate IC 2/1 via inverter IC 4/1. The common point of the input 19 and the inverter IC 4/1 is connected also to the positive pole of the supply voltage via the resistor R5.

The output of the NAND gate IC 2/1 is connected to the clock signal input CK of the flip-flop IC 3 through the inverter unit IC 4/5.

One output $\overline{Q}$ of the flip-flop IC 3 is connected to the data input D and also to one of the inputs of the NAND gate IC 2/2. The other output Q is connected to one of the inputs of the NAND gate IC 2/3.

The signal of the control switch 14 arrives to the input 20, which is connected to the reset input CL of the flip-flop IC 3 through the inverter unit IC 4/2 and to the two inputs each of the NAND gates IC 2/2 and IC 2/3, respectively. The common point of the input 20 and the inverter unit IC 4/2 is connected to the positive pole of the supply voltage through the resistor R6.

The output of the NAND age IC 2/2 is connected to the output 21 of the control unit 8 through the inverter unit IC 4/3, while the output 21 is in turn connected to those electromagnetic valves (not shown), of the valve mechanism 7 which effect shifting to the low speed (gear I). The output of the NAND gate IC 2/3 is connected to the output 22 of the control unit 8 through the unit IC 4/4, while the output 22 is connected in turn to the electromagnetic valves of unit 7 which effect change to the reverse gear. Between the outputs 21; 22 and the electromagnets; power amplifiers (now shown) are inserted.

By the aid of the system of the invention the process of freeing a stuck vehicle is carried out as follows:

If the driver sees that the vehicle can be brought out from its blocked position only by repeated forward and reverse shifting, he gives a command signal with the control switch 14 for the implementation of the system. Supposedly he started the motor prior to giving the command signal, but he may start it subsequently, too.

When the motor is running at idle speed, the angular velocity of the wheels 6 amounts to zero. As soon as the driver presses the throttle pedal 10, a signal appears on the output of the inverter IC 4/5 via the NAND gate IC 2/1. This causes a signal at the output $\overline{Q}$ of the flip-flop IC 3. This actuates the NAND gate IC 2/2, generating a signal at the output of inverter IC 4/3, resulting in a command in form of a control signal to the proper valves of the unit 7 for changing to the low forward speed.

Now, if the driver lets back the throttle pedal 10 into its basic (released) position, the flow of signals as described will be interrupted and the number of revolutions of the motor 1 decreases. As the driver allows the throttle pedal to return into its basic position, the angular velocity of the wheels 6 will also return to zero.

By again pressing the throttle pedal 10, a signal again appears on the output of the inverter IC 4/5 via the NAND gate IC 2/1. This time, however, a control signal is given on the output Q of the flip-flop IC 3 and through the NAND gate IC 2/3 and inverter IC 4/4 to the corresponding electromagnetic valves of the unit 7 for changing into the reverse gear.

Summing up what has been said, by the repeated pressing and releasing the throttle pedal 10 the signal appears alternatively on the output Q and on the output Q of the flip-flop IC 3. Accordingly, the electromagnetic valves 7 change alternatively to the low speed (gear I) and the reverse gear, respectively.

It becomes obvious that a prerequisite of the implementation of the system according to the invention is that the signals delivered by the signal transmitters 9 and 12 for the angular velocity should equal to zero. However, this is not a stringent requirement. The actual aim of the invention is to avoid severe gear changes. Accordingly the conditions may be mitigated so that angular velocity of the wheel 6 is considered practically as zero, if the vehicle is creeping with a speed of 3 km/h at most, and the number of revolutions of the motor 1 is considered as idle speed, if it lies below the lowest operative number of revolutions. In our case number of revolutions at idle amounts to 550 r/p.m., the lowest operative r.p.m. is about 800 r.p.m.

We claim:

1. An automatic auxiliary control system for freeing a vehicle having an engine and driving wheels by means of repeated forward/rearward operation, involving shifting alternately between forward and reverse directions, and wherein the vehicle includes an engine provided with a foot-controlled throttle movable between released and depressed positions, an automatic transmission, and electrically controlled valve means for shifting said transmission, which comprises,
   (a) a main on/off control switch for said control system,
   (b) first speed sensing means for sensing a speed value related to the speed of the driving wheels of the vehicle,
   (c) second speed sensing means for sensing a speed value related to the speed of the vehicle engine,
   (d) throttle sensing means for sensing when said foot-controlled throttle is in a released position,
   (e) control means operative upon the simultaneous presence of (i) a signal representing near-zero speed of said wheels, (ii) idle speed of said engine, and (iii) released position of said foot controlled throttle, to provide a shift command signal, and
   (f) said control means including a flip-flop type control element operative upon receiving successive command signals to effect shifting of said automatic transmission alternately between forward and reverse gears.

2. Apparatus according to claim 1, further characterized by
   (a) said control means including a pair of output circuits, one each for forward and reverse operation of said automatic transmission, and
   (b) a bi-stable flip-flop circuit device having separate outputs connected to respective ones of said output circuits.

3. Apparatus according to claim 2, further characterized by
   (a) each of said output circuits including a multiple-input control element,
   (b) one of the inputs to each of said multiple-input control elements comprising an output of said flip-flop circuit device, and
   (c) a second input to each of said multiple-input control elements comprising an output of said on/off control switch.

* * * * *